United States Patent

Schmidt et al.

[11] Patent Number: 5,999,692
[45] Date of Patent: Dec. 7, 1999

[54] EDITING DEVICE

[75] Inventors: Adam Schmidt; Markus Hasenzahl, both of Riedstadt, Germany

[73] Assignee: U.S. Philips Corporation, New York, N.Y.

[21] Appl. No.: 08/831,444

[22] Filed: Mar. 31, 1997

[30] Foreign Application Priority Data

Apr. 10, 1996 [DE] Germany ............................ 196 14 158

[51] Int. Cl.[6] .................................................. H04N 5/93
[52] U.S. Cl. ................................................ 386/54; 386/55
[58] Field of Search ................................. 386/54, 52, 55, 386/61, 62, 65, 96, 95, 100, 104, 4, 39; 360/13; H04N 5/93

[56] References Cited

U.S. PATENT DOCUMENTS

| | | | |
|---|---|---|---|
| 4,858,033 | 8/1989 | Chippendale | 360/14.2 |
| 5,469,270 | 11/1995 | Yamamoto | 386/55 |
| 5,583,652 | 12/1996 | Ware | 386/75 |
| 5,621,536 | 4/1997 | Kizu | 386/52 |

Primary Examiner—Robert Chevalier
Attorney, Agent, or Firm—Gregory L. Thorne

[57] ABSTRACT

To provide the possibility of introducing a time delay, or temporal offset, between video and audio data, an editing device (2) for non-linearly editing video data stored on a data storage medium (1) and audio data assigned to said video data, in which the video data are marked in a manner of assigned timecode data, and in which, during editing, the editing device (2) creates an editing list (3) which comprises, for each editing section, at least the assigned start and end timecode data of the video data of the editing section is characterized in that the editing device (2) edits the video data with reference to the assigned timecode data, in that, during editing of the video data, the editing device (2) allows the audio data assigned to the edited video data to be adjusted with a time delay relative to the video data, in that the editing device (2) comprises a unit which, dependent on the adjusted time delay, compute that number of sampling values of the audio data by which these audio data are displayed with a delay relative to the video data so that the desired time delay sets in at the display end, and in that the editing device (2) notes said number in the editing list (3).

5 Claims, 1 Drawing Sheet

EDITING DEVICE

The invention relates to an editing device for non-linearly editing video data stored on a data storage medium and audio data assigned to said video data, in which the video data are marked by means of assigned timecode data and in which, during editing, the editing device creates an editing list which comprises, for each editing section, at least the assigned start and end timecode data of the video data of the editing section. The invention also relates to a display device for displaying the video and audio data in accordance with an editing list created by the editing device.

When editing video and audio data stored on a storage medium, these data are rearranged and taken over section by section in editing sections. The video data are marked by means of a time code. The timecode data mark the video data with picture precision. For the editing process, each picture of the video data can be exactly accessed without the risk of confusion with other data. When creating the editing list, the timecode value of the first picture and the timecode value of the last picture, i.e. the timecode data of the start and the end of an editing section are generally noted in the editing list for each editing section. As a result, the editing list indicates a start and end value of a video sequence to be taken over for each editing section. This provides the possibility of taking over the data stored on the data storage medium in an arbitrary sequence and also only per section in the editing list. The video data can be arbitrarily rearranged in this manner.

In working through the editing list at the display end, the video sections noted by their timecode data in each editing section are displayed. If necessary, the audio data assigned to the video data are also displayed.

In non-linear editing, the data storage medium provides random access, so that an essentially faster access to individual video data and the assigned audio data is possible. In addition to the faster access, which is thereby possible during editing, this has the special advantage that when displaying the data of the desired sequence on the basis of the editing list, no temporary storage, for example, on a magnetic tape is necessary, but a display in accordance with the data of the editing list can be directly realized without any delay at the interfaces of the editing sections, i.e. the data can be displayed directly from the data storage medium in the desired sequence.

In known devices for editing and/or displaying the editing lists, the points of intersection defined for the video data and the timecode data assigned thereto simultaneously define also the points of intersection of the audio data. A temporal adaptation of the audio data is not possible. This is, for example, disturbing when the audio data accompanying the video data are not lip-synchronous with the video data at the display end.

It is an object of the invention to provide an editing device which allows setting of a time delay, or temporal offset, between the audio and video data, and to provide a display device which allows display of the data with the adjustable delay.

For an editing device, this object is solved in that the editing device edits the video data with reference to the assigned timecode data, in that, during editing of the video data, the editing device allows the audio data assigned to the edited video data to be adjusted with a time delay relative to the video data, in that the editing device comprises means which, dependent of the adjusted time delay, compute that number of sampling values of the audio data by which these audio data are displayed with a delay relative to the video data so that the desired time delay sets in at the display end, and in that the editing device notes said number in the editing list.

In the editing device, the video data are edited in known manner with reference to the timecode data. However, a desired time delay between the audio data permanently assigned to the video data and these video data can be adjusted in the editing device. Based on the adjusted time delay, the editing device determines that number of sampling values of the audio data by which these are displayed with a time delay relative to the video data in order that the desired time delay occurs. On the one hand, the number of audio data is dependent on the adjusted delay value and, on the other hand, it is dependent on the number of sampling values of the audio data per second.

This number for the delay of the audio data is noted in the editing list. The direction by which these data are to be delayed relative to the video data assigned thereto can be indicated with reference to the sign of the number.

At the display end, the audio data are read by the corresponding number of sampling values in a delayed manner, in conformity with this number which is noted in the editing list. The adjusted delay is thereby realized in the desired manner.

This provides the possibility of eliminating asynchronicity which may originally have been present between video and audio data.

In an embodiment of the invention, the editing device is characterized in that the time delay for each editing section is individually adjustable, and in that, for each editing section, the editing device individually computes that number of sampling values of the audio data by which these audio data are to be displayed with a delay relative to the video data in the respective editing section, so that the desired time delay sets in at the display end, and in that the editing device notes this number individually for each editing section in the editing list.

Advantageously, the time delay may be individually adjustable for each editing section. This time delay, or the number of sampling values of the audio data by which these are displayed with a delay, is then noted in the editing list for each editing section. Even for each editing section, a time delay of the audio data is thereby possible. This is particularly efficient when the video and audio data to be edited are composed of different recording sequences in which a different time delay may occur and has to be corrected.

For a display device for displaying the video and audio data in accordance with an editing list created by the editing device, the above-mentioned object is solved according to the invention in that the display device reads the video data from the data storage medium for each editing section with reference to the timecode values indicated in the editing list, and in that the display device reads the audio data from the data storage medium in such a way that the audio data assigned to the read video data are delayed by that number of sampling values which is indicated in the editing list.

When working through the editing list, the display device orients itself on the timecode values which are assigned to the video data. The video data are thus read and displayed on the basis of the timecode values. The audio data assigned to the video data are displayed with a delay for each editing section in conformity with the number of sampling values noted in the editing list for this editing section.

This provides the possibility of arbitrarily delaying the audio data relative to the video data for each editing section at the display end. This is possible, although the assignment between the video and audio data as such remains unchanged in the data storage medium. A corresponding correction is performed only when the editing list is created and when the data are displayed with reference to this list.

The data remain unchanged for other editing and display processes, so that different delay values are adjustable for possibly other lists to be created.

In a further embodiment of the invention this display device is characterized in that the display device reads the video data from the data storage medium for each editing section with reference to the timecode values indicated in the editing list, and in that the display device reads the audio data from the data storage medium in such a way that, for each editing section, the audio data assigned to the read video data are delayed by that number of sampling values which is indicated in the editing list for this editing section.

If an own number of audio data by which these data are to be displayed with a delay relative to the video data to which they are assigned is to be indicated in the editing list for each editing section, the display device evaluates this number separately for each editing section and controls the audio data with a corresponding time delay when the data are being displayed. The desired time delay for each editing section can thus be individually adjusted and realized.

Due to the time delay of the audio data which can be separately adjusted for each editing section, a gap or a disturbance may occur at the interfaces between the editing sections. To eliminate this gap or disturbance, a further embodiment of the invention is characterized in that the sound signal is suppressed at the interfaces between editing sections.

These and other aspects of the invention are apparent from and will be elucidated with reference to the embodiments described hereinafter.

Figure 2:
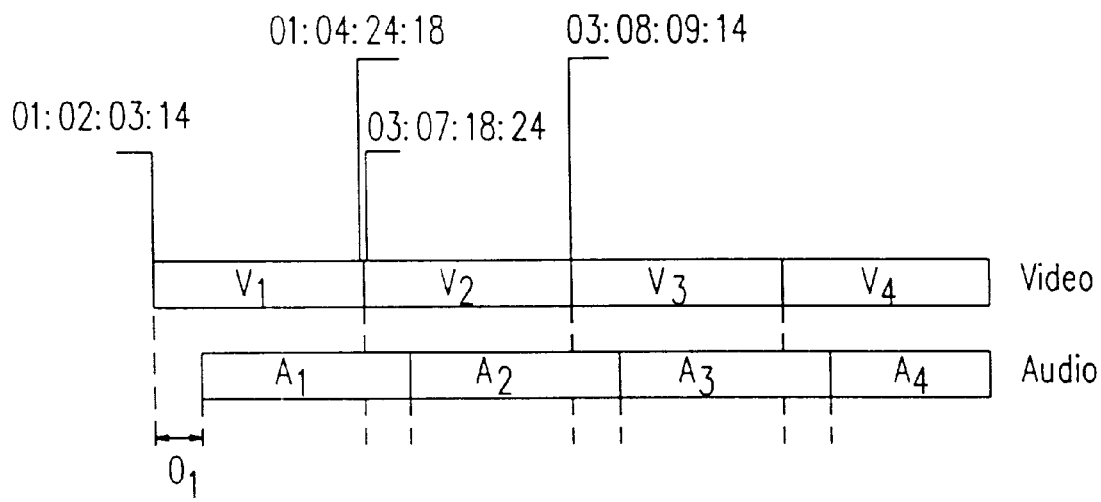
FIG. 2 shows diagrammatically a part of an editing list with several editing sections in which the audio data are delayed in the desired manner relative to the video data.
Figure 3:
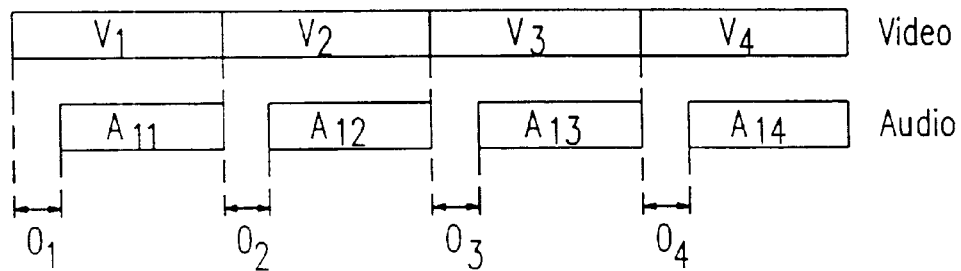

FIG. 3 corresponds to FIG. 2 with a separately adjustable time delay, or temporal offset, for each editing section.

Figure 1:
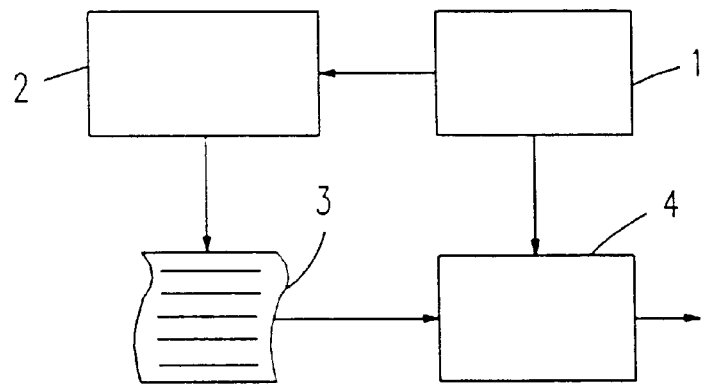
FIG. 1 shows diagrammatically the cooperation of a data storage medium with the editing device according to the invention and the display device according to the invention.

FIG. 1 shows diagrammatically a data storage medium 1. This data storage medium is of a type allowing random access to the video data stored therein and the audio data assigned to these video data. Moreover, timecode data are stored, which are assigned to the video data. Each picture of the video data is individually marked by means of the timecode data. In response to the random access, arbitrary sections of the video data can be accessed with a very small time delay.

FIG. 1 further shows diagrammatically an editing device 2 which can access the data which are stored on the data storage medium 1. An editing list 3, which comprises the timecode data for each editing section, which timecode data are assigned to the video data for the editing section, is created by means of the editing device 2. The time code of the first picture of the video sequence of the editing section and the time code of the last picture of this video sequence are noted in the editing list for each editing section.

A numerical value, for which the audio data are displayed with a delay relative to the video data to which they are assigned, is individually noted in the editing list 3, preferably for each editing section.

The display device 4 also shown diagrammatically in FIG. 1 is oriented on the data of the editing list 3. For each editing section, the video data are read from the storage medium 1 in conformity with the timecode values noted in the editing list 3. Addressing takes place with reference to the timecode data, and the video data are supplied from the output of the display device 4 in the sequence indicated in the editing list 3. Since the storage medium 1 provides random access, a direct display may be realized so that, also at interfaces between several editing sections, there will be no time delay or gap.

The display device 4 controls the display of the audio data to be read from the storage medium in such a way that the audio data assigned to the video data are displayed with a delay by as many sampling values as are indicated in the editing list for each editing section. The audio data can then be displayed with a time delay relative to the video data.

FIG. 2 shows diagrammatically some editing sections with video and audio data assigned thereto, and associated timecode data.

FIG. 2 shows four editing sections to which video data blocks $V_1$, $V_2$, $V_3$ and $V_4$ are assigned. The video data are identified with reference to timecode values, in which, for example, the video data $V_1$ of the first editing section are marked by timecode values ranging from 01:02:03:14 to 01:04:24:18. The video data which are stored on the storage medium 1 shown in FIG. 1 and to which timecode values within this range are assigned, are thus associated with the editing section. In a corresponding manner, start and end timecode values are noted in the editing list 3 of FIG. 1 for the further editing sections $V_2$ to $V_4$.

In known editing and display devices, the assigned audio data blocks, which are denoted by $A_1$ to $A_4$ in FIG. 2, are displayed in the current fixed assignment relative to the video data.

However, the invention provides the possibility of a time delay of the audio data relative to the video data. This is indicated by means of the time delay, or temporal offset, $O_1$ in FIG. 2. In the example shown in FIG. 2, the audio data are thus displayed with this time delay relative to the video data to which they are assigned. Such a delay may alternatively be realized in such a way that the audio data are displayed at a corresponding earlier instant than the video data.

In the example shown in FIG. 2, this time delay $O_1$ is identical for all editing sections. The time delay is realized in that, in accordance with the number of audio sampling values indicated in the editing list, the audio data are read from the data storage medium 1 shown in FIG. 1 with a delay relative to the video data. Since this data storage medium provides random access, an arbitrary delay may, in principle, be adjusted.

FIG. 3 shows an editing list with different editing sections, as shown in FIG. 2. An individual time delay $O_1$, $O_2$, $O_3$ and $O_4$ is adjustable for each editing section in the example shown in FIG. 3. This may be efficient when a possible asynchronicity between audio and video data, as stored on the data storage medium 1 of FIG. 1, fluctuates or is different from recording section to recording section. The time delay can then be selected individually for each editing section in accordance with FIG. 3.

We claim:

1. An editing device (2) for non-linearly editing video data stored on a data storage medium (1) and audio data assigned to said video data, in which the video data are marked by means of assigned timecode data, and in which, during editing, the editing device (2) creates an editing list (3) which comprises, for each editing section, at least the assigned start and end timecode data of the video data of the editing section, characterized in that the editing device (2) edits the video data with reference to the assigned timecode data, in that, during editing of the video data, the editing device (2) allows the audio data assigned to the edited video data to be adjusted with a time delay relative to the video data, in that the editing device (2) comprises means which, dependent on the adjusted time delay, compute that number of sampling values of the audio data by which these audio data are displayed with a delay relative to the video data so that the desired time delay sets in at the display end, and in that the editing device (2) notes said number in the editing list (3).

2. An editing device as claimed in claim 1, characterized in that the time delay for each editing section is individually adjustable, and in that, for each editing section, the editing device (2) individually computes that number of sampling values of audio data by which these audio data are to be displayed with a delay relative to the video data in the respective editing section, so that the desired time delay sets in at the display end, and in that the editing device (2) notes said number individually for each editing section in the editing list (3).

3. A display device for displaying video and audio data in accordance with an editing list created by the editing device as claimed in claim 1, characterized in that the display device (4) reads the video data from the data storage medium (1) for each editing section with reference to the timecode values indicated in the editing list (3), and in that the display device (4) reads the audio data from the data storage medium (1) in such a way that the audio data assigned to the read video data are delayed by that number of sampling values which is indicated in the editing list (3).

4. A display device for displaying video and audio data in accordance with an editing list created by the editing device as claimed in claim 2, characterized in that the display device (4) reads the video data from the data storage medium (1) for each editing section with reference to the timecode values indicated in the editing list (3), and in that the display device (4) reads the audio data from the data storage medium (1) in such a way that, for each editing section, the audio data assigned to the read video data are delayed by that number of sampling values which is indicated in the editing list (3) for said editing section.

5. A display device as claimed in claim 4, characterized in that the sound signal is suppressed at the interfaces between editing sections.

* * * * *